(12) United States Patent
Harms et al.

(10) Patent No.: US 7,714,458 B2
(45) Date of Patent: May 11, 2010

(54) METHOD FOR OPERATING A WIND ENERGY PLANT AND WIND ENERGY PLANT

(75) Inventors: Ulrich Harms, Hamburg (DE); Wolfgang Kabatzke, Geesthacht (DE); Mark Jurkat, Norderstedt (DE)

(73) Assignee: Nordex Energy GmbH, Norderstadt (DE)

( * ) Notice: Subject to any disclaimer, the term of this patent is extended or adjusted under 35 U.S.C. 154(b) by 224 days.

(21) Appl. No.: 12/104,099

(22) Filed: Apr. 16, 2008

(65) Prior Publication Data

US 2009/0212566 A1 Aug. 27, 2009

(30) Foreign Application Priority Data

Feb. 22, 2008 (DE) .................. 10 2008 010 543

(51) Int. Cl.
*F03D 7/04* (2006.01)
*F03D 9/00* (2006.01)
*H02P 9/00* (2006.01)

(52) U.S. Cl. ....................................................... 290/44
(58) Field of Classification Search .................... 290/44
See application file for complete search history.

(56) References Cited

U.S. PATENT DOCUMENTS

| | | | | |
|---|---|---|---|---|
| 4,160,170 A * | 7/1979 | Harner et al. | ................. | 290/44 |
| 4,161,658 A * | 7/1979 | Patrick | ......................... | 290/44 |
| 4,189,648 A * | 2/1980 | Harner | ......................... | 290/44 |
| 4,584,486 A * | 4/1986 | Quynn | ......................... | 290/44 |
| 7,352,075 B2 * | 4/2008 | Willey et al. | .................. | 290/44 |
| 7,417,332 B2 * | 8/2008 | Malakhova et al. | ........... | 290/44 |
| 7,525,209 B2 * | 4/2009 | Kabatzke et al. | .............. | 290/44 |
| 7,602,075 B2 * | 10/2009 | Erdman et al. | ................ | 290/44 |
| 7,629,702 B2 * | 12/2009 | Schubert | ...................... | 290/44 |
| 2008/0150282 A1* | 6/2008 | Rebsdorf et al. | .............. | 290/44 |
| 2009/0174186 A1* | 7/2009 | Nyborg | ....................... | 290/44 |
| 2009/0212566 A1* | 8/2009 | Harms et al. | .................. | 290/44 |

FOREIGN PATENT DOCUMENTS

DE 10 2006 054 768 A1 5/2008
WO WO 2008131775 A2 * 11/2008

* cited by examiner

*Primary Examiner*—Joseph Waks
(74) *Attorney, Agent, or Firm*—Vidas, Arrett & Steinkraus, P.A.

(57) ABSTRACT

A method for operating a wind energy plant having a rotor with at least one rotor blade which has an adjustable pitch angle and a generator coupled to the rotor, and a regulation means which, if a there is a deviation of the rotation speed of the generator or rotor from a rotation speed set point, adjusts the pitch angle of the at least one rotor blade such that the rotation speed set point is reached again, wherein an electrical quantity provided by the wind energy plant by means of a generator and fed into a grid is reduced to a predetermined value in a short time by a reduction of a preset value for the generator, wherein prior to the regulation means noticing a deviation of the rotation speed of the rotor or generator from the rotation speed set point effected by the reduction of the preset value, an adjustment of the at least one rotor blade to a new pitch angle is initiated, wherein at the new pitch angle the rotation speed of the rotor or the generator reaches the rotation speed set point at the reduced electrical quantity and the current wind speed.

20 Claims, 2 Drawing Sheets

METHOD FOR OPERATING A WIND ENERGY PLANT AND WIND ENERGY PLANT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The invention relates to a method for operating a wind energy plant and to a wind energy plant having a rotor with at least one rotor blade which has an adjustable pitch angle, a generator coupled to the rotor, and a regulation means which, if there is a deviation of the rotation speed of the generator or rotor from a rotation speed set point, adjusts the pitch angle of the at least one rotor blade such that the rotation speed set point is reached again.

Fault of a grid which is fed by the wind energy plant may cause a sudden load shedding, wherein the generator torque or the generator power of the wind energy plant falls off to zero within a very short time period. Moreover, it is also possible to reduce an electrical quantity provided by the plant by means of a generator and fed into a grid to a predetermined value in a controlled manner and in a short time by reduction of a preset value for the generator, such as a preset generator torque or the preset generator power, respectively, for example by means of a corresponding control means of the plant. In this context, in a short time means a time period of less than one minute, in particular less than half a minute.

With increasing importance of regenerative energy sources, energy supply companies more and more make the same technical demands on wind energy plants or wind parks, respectively, as they do on conventional power plants. An example is the demand for a contribution of wind energy plants to a fast reduction of excess power in the grid. To this end, the energy supply company sends a respective signal predetermining a defined power level. Such a signal can be independent of other preset values, for example active power set points. The energy supply companies more and more demand a very fast reduction of the electrical energy of the plant fed into the grid. In a couple of countries, time periods of a few seconds, for example five seconds, are discussed or already required for a reduction of load to a value of for example 20% of the capacity of the grid connection.

In order to meet these rigorous timing requirements, the electrical quantity provided must be reduced by means of a very fast reduction of the generator torque or generator power, respectively. Through this reduction of the counter load generated by the generator, however, the rotor of the wind energy plant is accelerated and rotation speeds occur which cause the regulation means to interact by increasing the pitch angle. The pitch angle is a constructive quantity, namely the angle between the rotor plane and the chord line of the rotor blade. As soon as the regulation means notices a deviation of the rotation speed of the rotor or generator from the rotation speed set point, it reacts by changing the pitch angle. However, the regulation means is designed with regard to the usual wind turbulences. With regard to a sudden load shedding, the regulation means reacts too slowly. This can lead to detrimental excess rotation speeds of the rotor or the generator, respectively. To avoid this, the generator torque or the generator power, respectively, can only be reduced with a limited speed. For this reason, it is difficult to fulfill the strict requirements of the energy supply companies with current systems.

In particular for wind parks, an additional problem is that the request for a reduction of the overall active power provided must be allocated to the individual wind energy plants in an intelligent manner. Receiving, evaluating and transmitting the individual set point signals to the plants by means of the wind park controller takes a certain time, which is then no longer available for a reduction of the load by the plants. The aforementioned problem is therefore getting worse for plants in wind parks.

With known systems, it is not possible to change the active power of a wind energy plant to 20% of the rated power within a few seconds, for example within five seconds. In the alternative, the electrical quantity provided can be reduced by disconnecting the plant from the grid, that is, by a shutdown, but this is often undesirable. In particular, a shutdown of the plant is acceptable only under certain exceptional conditions.

Based on the prior art described, the invention was therefore based on the problem to provide a method and a wind energy plant that allow for a fast load reduction to a new stable operating point without disconnection from the grid.

BRIEF SUMMARY OF THE INVENTION

The problem is solved by the invention on the one hand by a method for operating a wind energy plant, the wind energy plant having a rotor with at least one rotor blade which has an adjustable pitch angle, the wind energy plant having a generator coupled to the rotor, and a regulation means which, if there is a deviation of the rotation speed of the generator or rotor from a rotation speed set point, adjusts the pitch angle of the at least one rotor blade such that the rotation speed set point is reached again, wherein an electrical quantity provided by the wind energy plant by means of a generator and fed into a grid is reduced to a predetermined value in a short time by reduction of a preset value for the generator, and wherein prior to the regulation means noticing a deviation of the rotation speed of the rotor or generator from the rotation speed set point effected by the reduction of the preset value, an adjustment of the at least one rotor blade to a new pitch angle is initiated, wherein at the new pitch angle the rotation speed of the rotor or generator reaches the rotation speed set point at the reduced electrical quantity and the current wind speed, that is at the wind speed acting on the rotor.

On the other hand, according to the invention, the problem is solved by a wind energy plant having a rotor with at least one rotor blade which has an adjustable pitch angle, the wind energy plant having a generator coupled to the rotor, a regulation means designed to adjust the pitch angle of the at least one rotor blade such that, if there is a deviation of the rotation speed of the generator or rotor from a rotation speed set point, the rotation speed set point is reached again, and a control means designed to reduce an electrical quantity which is provided by the wind energy plant by means of a generator and fed into a grid to a predetermined value in a short time by reduction of a preset value for the generator, wherein the control means is further designed to initiate an adjustment of the at least one rotor blade to a new pitch angle prior to the regulation means noticing a deviation of the rotation speed of the rotor or generator from the rotation speed set point effected by the reduction of the preset value, wherein at the new pitch angle the rotation speed of the rotor or generator reaches the rotation speed set point at the reduced electrical quantity and the current wind speed. Therein, the deviation of the rotation speed of the rotor or generator from the rotation speed set point noticed by the regulation means is a deviation large enough to trigger a regulation action. The rotation speed set point can be the nominal rotation speed of the generator or the rotor, respectively. The preset value is a value given to the generator in order to obtain a desired electrical quantity actually provided by the plant, such as for example active power.

Given a signal to quickly reduce the load, a reduction of the preset value, for example the generator torque or the generator power, and therewith of the electrical quantity, is performed as quickly as possible. In order to avoid that a dangerous excess rotation speed of the rotor or generator, respectively, can occur, according to the invention, an adjustment to a new, larger pitch angle is initiated at the same or at an earlier point in time. That is, the pitch angle is increased anticipatory in order to reduce the received power of the rotor, so that an undesirable increase of the rotation speed as a result of the reduced preset value is avoided. According to the invention, the control element for reducing the electrical quantity and the control element for the pitch angle cooperate. The wind energy plant stays connected to the grid during the fast load reduction. A disconnection from the grid does not take place.

The electrical quantity can be reduced to a value of zero or to a value different from zero. The new pitch angle to be set can be determined based on the predetermined value for the electrical quantity, the current rotation speed of the rotor or generator, respectively, the current pitch angle and the operating condition of the plant. This is especially advantageous when reducing the electrical quantity to a value not equal to zero.

The wind energy plant can have a suitable measurement device for measuring the wind speed. The regulation used in the wind energy plant can for example work with two controllers coupled to each other, namely a converter controller and a pitch controller. The aim of the overall system is to accomplish an optimal power output of the plant to the grid in regular operating mode. When the wind speed reaches the nominal wind speed, from this time on the active power output is to be regulated or limited, respectively, to the nominal power. In this case, the plants can for example work as so-called speed-controlled plants, wherein above the nominal wind speed and when the rated power is reached, the rotation speed of the plant is kept constant. The two controllers of the plant are working together conditionally, that is through the rated power and special plant-system-states (for example connecting to the grid, hysteresis), the cooperation of the controllers is well-defined.

The invention relates to special operating states the controller of the plant is not designed for, and achieves a safety increase of the plant by acting on the pitch adjustment. In particular, according to the invention, it is possible to reduce load to a stable power value in a short period of time, for example less than a minute, especially less than half a minute, preferably not exceeding 10 seconds, in particular not exceeding 5 seconds or less than 5 seconds. The predetermined value of the reduced electrical quantity can be for example 60%, preferably 40%, more preferably 20% of the nominal value of the electrical quantity. Thenceforward until cancelled, the set point for the electrical quantity stays at the predetermined reduced value. The method of the invention and the plant control means of the invention, respectively, can be used advantageously also for a fast increase of the electrical quantity provided by the plant, when for example the pitch angle is reduced anticipatory in order to increase the received power of the plant quickly.

It is possible to perform the adjustment of the new pitch angle by the regulation means. In this case, the control means only initiates the adjustment of the new pitch angle. So, the regulation can remain active during the activation of the new pitch angle. The control means and the regulation means can form a combined device. It is possible to determine the new pitch angle for the predetermined value of the reduced electrical quantity. To this end, the control means of the plant can be designed correspondingly. In order to determine this new pitch angle, the control means can be provided for example with characteristic diagrams and/or functions.

The rotor of the wind energy plant usually has more than one rotor blade, for example three rotor blades. Then, correspondingly, the pitch angles of all rotor blades can be adjusted according to the invention. Also, the wind energy plant can be part of a wind park, wherein the plants of the wind park are controlled by a wind park controller.

The wind energy plant of the invention can be suitable for performing the method according to the invention.

With regard to practice, it is especially feasible if the preset value is the preset generator torque or the preset generator power. According to a further especially feasible aspect, the electrical quantity can be the active power actually provided by the wind energy plant. According to another aspect, the adjustment of the new pitch angle can be performed by reducing by a defined offset a rotation speed set point supplied to the regulation means. The pitch controller establishes the difference between a rotation speed set point supplied to the pitch controller and a current rotation speed supplied to the pitch controller for example by a measurement device. In so far as a deviation is detected, the pitch angle is changed by the controller. By subtracting an offset signal from the rotation speed set point supplied to the controller, within the controller a large set point/current value difference can be generated very quickly, leading to a correspondingly fast regulation action by the controller. For the adjustment of the new pitch angle, a switching on of a disturbance variable is performed in an especially simple manner. According to an alternative or additional approach to the adjustment of the new pitch angle, a rotation speed set point supplied to the regulation means can be increased by a defined offset. Furthermore, a minimal and a maximal pitch angle are usually given to the regulation means, limiting the adjusting range of the controller. In this way, the controller can determine pitch angles only within the limits formed by the minimal and maximal angles. The maximum pitch angle usually is about 90° for all operating states, that is flag position of the rotor blade. The minimal pitch angle depends on the operating state of the plant. In regular production mode, it is usually 0°. An alternative or additional option for adjusting the new pitch angle therefore is to increase the minimal pitch angle supplied to the regulation means by a defined offset. With this design as well, a regulation action can be initiated quickly and in an especially simple manner.

By adding a defined offset, that is a defined value, to an input variable of the regulation means, a fast influence on the regulation means is possible. Therein, the offset is defined such that the pitch angle desired in each case is adjusted quickly. For example, the offset values can be determined empirically and retained in characteristic diagrams. It is possible to add a defined offset to only one or to a plurality of input variables of the regulation means. The offset can be cancelled after a certain time and/or when going below a predetermined rotation speed of the generator or rotor. According to another aspect, the offset can be reduced over time to zero starting from an initial maximum value. In this aspect, the regulation means is therefore put down to its regular operating mode over time with the regular input variables for compensation of wind turbulences, by means of reducing the added offset over time to zero.

This shall be illustrated on the basis of an example for adding an offset to the input variable of the minimum pitch angle.

For determining a new, minimal pitch angle to be supplied to the regulation means, the current actual pitch angle can be increased by a respective pitch angle offset. A value A may be subtracted from the new minimal pitch angle determined in the described manner. The value A is time-variant and is increased, starting from zero, by means of a time-ramp or a function to a value equal to the pitch angle offset. In this way, the pitch angle offset is reduced over time, starting from an initial maximum value, to zero. The value A can be adjusted such that the rotation speed does not fall below the nominal rotation speed.

The offset to be added in each case can be determined by means of at least one characteristic diagram which can be retained in the control means of the plant for this purpose. Such a characteristic diagram can contain for example the pitch angles required to reach the rotation speed set point for the rotation speed of the rotor or generator, respectively, in dependence on different wind speeds for different predetermined electrical quantities, for example active power values. In the alternative, it is also possible to calculate the offset by means of at least one function which can be retained in the control means for this purpose. Such a function can for example describe mathematically the pitch angle required for a rotation speed set point in dependence on different wind speeds for different predetermined electrical quantities, for example active power values.

According to another aspect, it is possible to initiate the adjustment to a new pitch angle only if the rotation speed of the rotor or generator is above a threshold rotation speed and/or if the preset value, for example the generator torque or the generator power, prior to its reduction is above a threshold preset value, that is for example a threshold generator torque or a threshold generator power. To this end, the control means can have a comparison means for comparing the rotation speed of the rotor or generator to a threshold rotation speed or the preset value to a threshold preset value, respectively. In particular when the pitch angle is for example 0°, a fast load shedding can lead to an undesired excess rotation speed only if the rotation speed of the rotor or generator, respectively, is close to the nominal rotation speed. For this reason, in such a case the adjustment to a new pitch angle is necessary only above a process- and plant-dependent threshold rotation speed or a process- and plant-dependent threshold preset value, respectively. The threshold value can for example be the nominal rotation speed, or a certain percentage of the nominal torque or the nominal power. The threshold value can then increase with decreasing difference between the nominal rotation speed, the nominal torque or the nominal power, respectively, and the current rotation speed, the current torque or the current power, respectively.

BRIEF DESCRIPTION OF THE SEVERAL VIEWS OF THE DRAWINGS

In the following, an embodiment of the invention is explained in greater detail on the basis of drawings.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
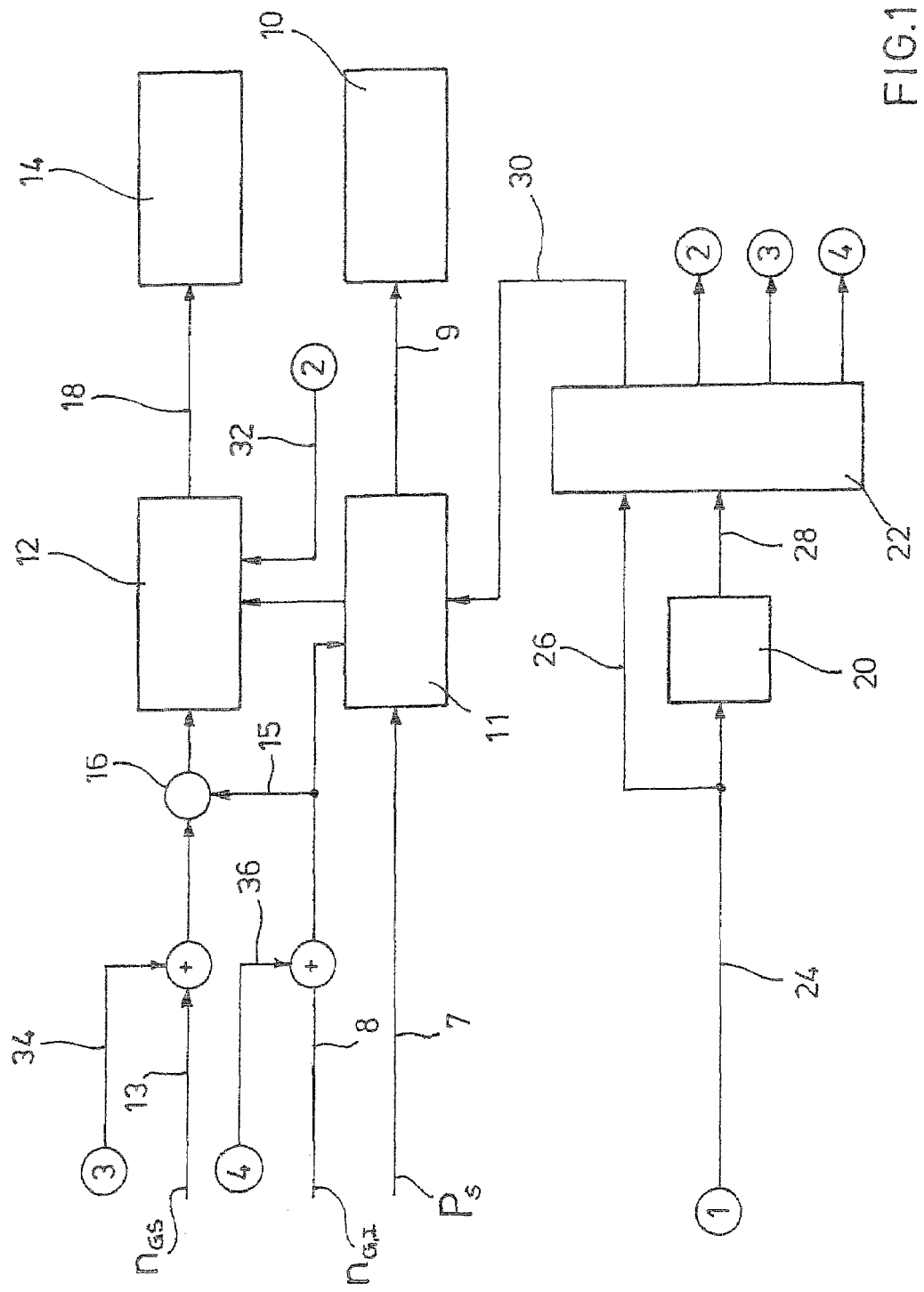
FIG. 1 shows schematically a block diagram illustrating the operation of the wind energy plant of the invention.

In FIG. 1, a block diagram is shown illustrating the operation of the wind energy plant of the invention. The wind energy plant has, in a manner known as such, a power train not shown in detail which carries at its front end a rotor also not shown having at least one, preferably three rotor blades not shown, and which leads to a so-called generator converter unit at is rear end. The generator converter unit has a generator not shown, a converter 10 and a converter controller 11 controlling the converter 10 through a control channel 9. By means of the converter controller 11, the active power actually provided by the plant is adjustable. The generator converter unit is not necessarily designed as a constructive or structural unit, but denominates generator and converter working together in order to provide the desired electrical quantity of the wind energy plant, for example the active power. The converter controller 11 receives as input variables an active power set point $P_S$ and a current generator rotation speed $n_{GI}$, as illustrated by channels 7, 8.

The pitch angle of the rotor blade or the rotor blades, respectively, is adjustable by a regulation means 12, in the present example a pitch controller 12 (also: blade controller), and a pitch angle control means 14 (also: pitch activation). The rotation speed of the generator or rotor, respectively, can be controlled through the blade angle, so that the pitch controller 12 works as a rotation speed controller 12. The pitch controller 12 is supplied with a generator rotation speed set point $n_{GS}$ through channel 13 and with the current generator rotation speed $n_{GI}$ through a channel 15 as input variables for the regulation, as illustrated in FIG. 1 by node 16. In addition, the pitch controller 12 receives a maximal and a minimal pitch angle which limit the valid adjustment range for the pitch angle. Corresponding to the input variables, the pitch controller 12 controls the pitch angle control means 14 through the channel 18.

If a fast reduction of an electrical quantity fed into an electric grid, for example the active power, is requested, the signal (1) for the fast reduction is applied to a control means 22 with an evaluation program through channels 24 and 26, or, as the case may be, through a delay 20 through channels 24 and 28, respectively. The control means 22 controls the converter controller 11 directly through channel 30 in order to initiate the desired reduction of the electrical quantity. In order to prevent a related increase of the rotation speed of the generator or rotor, the control means 22 can generate an offset (2) for the minimal pitch angle, an offset (3) for the generator rotation speed set point $n_{GS}$ and/or an offset (4) for the current generator rotation speed $n_{GI}$ at the same point in time or earlier as the reduction of the electrical quantity is initiated, prior to the pitch controller 12 notices a deviation of the rotation speed of the rotor or generator from a rotation speed set point.

The offset (2) for the minimal pitch angle can be supplied directly to the pitch controller 12, as shown by channel 32. This offset (2) for the minimal pitch angle can be selected such that the new minimal pitch angle is in each case higher than the current pitch angle applied. Likewise, the offset (3) for the generator rotation speed set point $n_{GS}$ can be added to the generator rotation speed set point $n_{GS}$, as shown by channel 34. In particular, the offset (3) can be negative, so that the rotation speed set point supplied to the pitch controller 12 is reduced by the offset (3). Subsequently, the generator rotation speed set point modified by the offset (3) is supplied to the pitch controller 12. Finally, the offset (4) for the current generator rotation speed $n_{GI}$ can be added to the current generator rotation speed $n_{GI}$, as illustrated by channel 36. The current generator rotation speed $n_{GI}$, increased by the offset (4) being positive in particular, is then supplied to the pitch controller 12 through channel 15 and node 16.

Generating and supplying the offsets (2), (3) and/or (4) to the pitch controller 12 in each case leads to the pitch controller 12 controlling the pitch angle control means 14 such that the pitch angle control means increases the pitch angle of the rotor blades in order to reduce the rotation speed of the generator or rotor, respectively. In this way, by means of the fast power reduction, detrimental excess rotation speeds of the generator or rotor, respectively, caused under certain circumstances, are avoided in advance. The offsets (2), (3) and (4) can be generated and supplied to the pitch controller 12 alternatively or in any combination. The size of the offsets (2), (3), and (4) is selected by the control means 22 such that the rotation speed of the rotor or generator at the power reduction needed in each case, as a consequence of the effected adjustment to a new pitch angle, again adopts the rotation speed set point.

Figure 2:
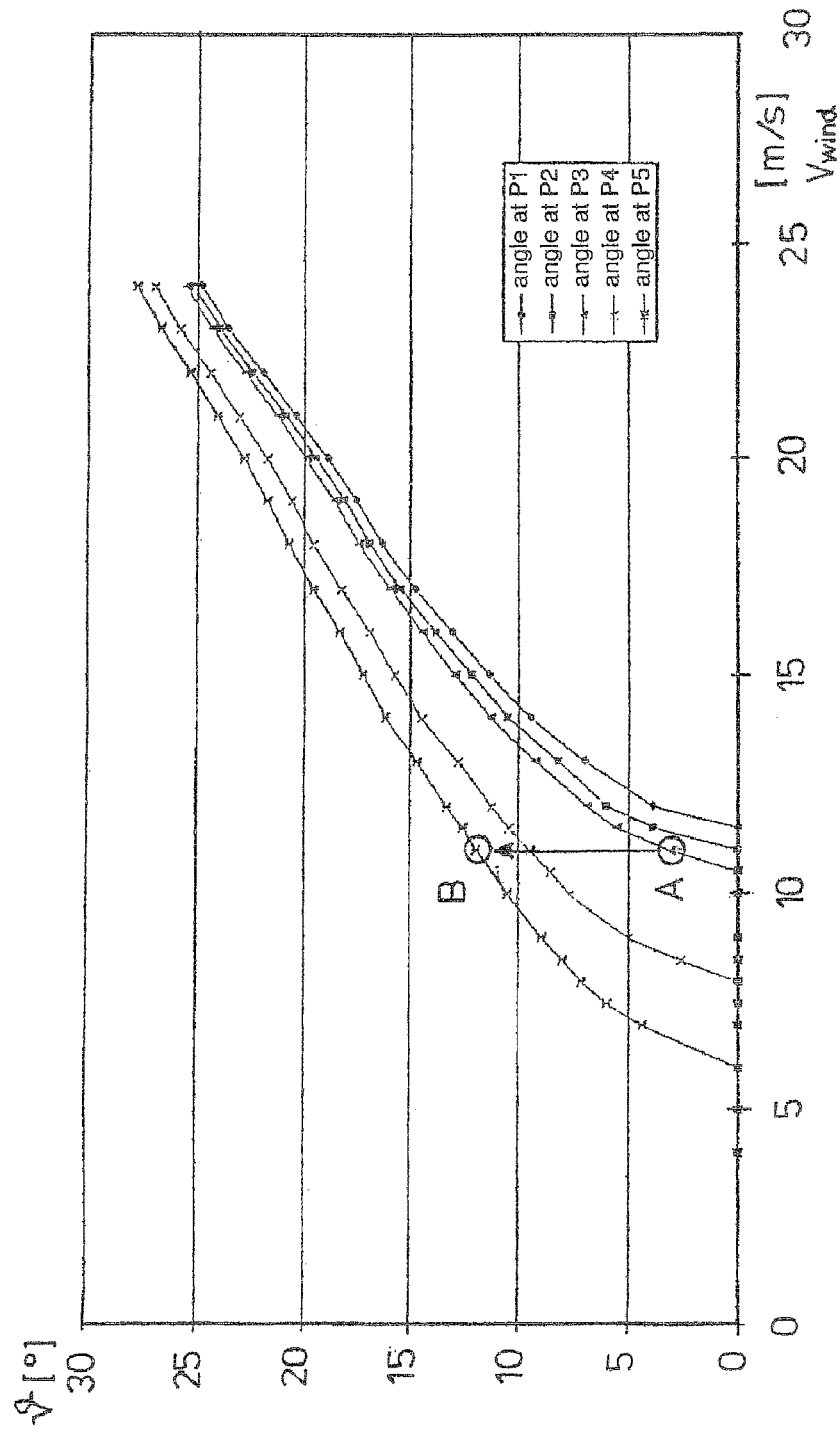
FIG. 2 shows schematically a characteristic diagram illustrating the operation of the method of the invention and of the wind energy plant of the invention.

The determination of the new pitch angle needed in each case shall be explained on the basis of the diagram shown in FIG. 2. In the characteristic diagram shown in FIG. 2, the current wind speed in [m/s] acting on the wind energy plant is assigned to the x-axis. The pitch angle υ in [°] of the rotor blades of the wind energy plant, in the present example of all three rotor blades, is assigned to the y-axis. Five characteristic curves for different electrical power values P1, P2, P3, P4, P5 provided to a grid by a generator are found in the diagram, wherein P1>P2>P3>P4>P5. The characteristic curves in each case indicate the values leading to the rotation speed set point for the generator or rotor desired in each case.

With the characteristic diagram, it is possible to determine a target pitch angle at which the rotation speed of the rotor or generator again adopts the rotation speed set point on the basis of the current plant power and the requested reduced target power of the plant at a current wind speed. This shall be explained by means of an example:

At the working point denoted in the figure by A, the wind energy plant generates an active power P3 at a wind speed of about 11 m/s and at a pitch angle of about 3°. If now an energy supply company requests a power reduction for example to a lower power P5, the corresponding working point of the wind energy plant can be determined by means of the characteristic diagram. In the diagram, it is denoted by B. Thus, it is switched from the characteristic curve for P3 to the characteristic curve for P5. Given the wind speed staying constant, at the reduced power P5 it is necessary to increase the pitch angle to about 12° in order to again establish the preconditions for reaching the rotation speed set point of the rotor or generator, respectively. For other wind speeds, the needed pitch angle can be determined along the characteristic curve. Thus, for a predetermined power, in each case a regulation is performed along the corresponding characteristic curve.

In order to avoid detrimental excess rotation speeds in the course of the fast load reduction by a fast reduction of the preset value, for example the generator torque or the generator power, according to the invention, already at the point in time when the reduction of the preset value is initiated, or even earlier, the adjustment of the three rotor blades to the new pitch angle of about 12° is initiated. This is done for example by increasing the minimal pitch angle supplied to the regulation means 12 by an offset, as explained above. In the example illustrated, the new minimal pitch angle to be applied is determined by increasing the current pitch angle of 3° by an offset of 9°. So, the new minimal pitch angle to be applied corresponds to the desired target angle of 12°. Of course, in the alternative or in addition, it is also possible to add an offset to other input variables of the regulation means, for example the rotation speed set point or the current rotation speed of the rotor or generator, respectively, supplied to the regulation means.

Afterwards, in order to hand over full control again to the regulation means 12 gradually, the offset and with it the minimal pitch angle supplied to the regulation means 12 is reduced from the initial maximal value of the offset along a time-ramp or a function to zero. Then, the regulation means 12 can regularly control the pitch angle at the reduced active power and the reduced preset value, corresponding to the occurring wind speed variations.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. Method for operating a wind energy plant, the wind energy plant having a rotor with at least one rotor blade which has an adjustable pitch angle, the wind energy plant having a generator coupled to the rotor, and a regulation means which, if there is a deviation of the rotation speed of the generator or rotor from a rotation speed set point, adjusts the pitch angle of the at least one rotor blade such that the rotation speed set point is reached again, wherein an electrical quantity provided by the wind energy plant by means of a generator and fed into a grid is reduced to a predetermined value in a short time by reduction of a preset value for the generator, characterized in that prior to the regulation means (12) noticing a deviation of the rotation speed of the rotor or generator ($n_{GI}$) from the rotation speed set point ($n_{GS}$) effected by the reduction of the preset value, an adjustment of the at least one rotor blade to a new pitch angle (υ) is initiated, wherein at the new pitch angle (υ) the rotation speed of the rotor or generator ($n_{GI}$) reaches the rotation speed set point at the reduced electrical quantity (P1, P2, P3, P4, P5) and the current wind speed ($V_{Wind}$).

2. Method according to claim 1, characterized in that the preset value is a preset generator torque or a preset generator power.

3. Method according to claim 1, characterized in that the electrical quantity (P1, P2, P3, P4, P5) is the active power (P1, P2, P3, P4, P5) of the wind energy plant.

4. Method according to claim 1, characterized in that the new pitch angle (υ) is adjusted by way of reducing a rotation speed set point ($n_{GS}$) supplied to the regulation means (12) by a defined offset.

5. Method according to claim 4, characterized in that the offset is reduced over time to zero starting from an initial maximum value.

6. Method according to claim 4, characterized in that the offset is determined by means of a characteristic diagram.

7. Method according to claim 4, characterized in that the offset is determined by means of at least one function.

8. Method according to claim 1, characterized in that the new pitch angle (υ) is adjusted by way of increasing a current rotation speed ($n_{GI}$) supplied to the regulation means (12) by a defined offset.

9. Method according to claim 1, characterized in that the new pitch angle (υ) is adjusted by way of increasing a minimal pitch angle supplied to the regulation means (12) by a defined offset.

10. Method according to claim 1, characterized in that the adjustment to the new pitch angle (υ) is initiated only if the rotation speed of the rotor or generator ($n_{GI}$) is above a threshold rotation speed and/or if the preset value prior to its reduction is above a threshold preset value.

11. Wind energy plant having a rotor with at least one rotor blade which has an adjustable pitch angle, the wind energy plant having a generator coupled to the rotor, a regulation means designed to adjust the pitch angle of the at least one rotor blade such that, if there is a deviation of the rotation speed of the generator or rotor from a rotation speed set point, the rotation speed set point is reached again, and a control means designed to reduce an electrical quantity which is provided by the wind energy plant by means of a generator and fed into a grid to a predetermined value in a short time by reduction of a preset value for the generator, characterized in that the control means (22) is designed to initiate an adjustment of the at least one rotor blade to a new pitch angle (υ) prior to the regulation means (12) noticing a deviation of the rotation speed of the rotor or generator ($n_{GI}$) from the rotation speed set point ($n_{GS}$) effected by the reduction of the preset value, wherein at the new pitch angle (υ) the rotation speed of the rotor or generator ($n_{GI}$) reaches the rotation speed set point ($n_{GS}$) at the reduced electrical quantity (P1, P2, P3, P4, P5) and the current wind speed ($V_{Wind}$).

12. Wind energy plant according to claim 11, characterized in that the preset value is a preset generator torque or a preset generator power.

13. Wind energy plant according to claim 11, characterized in that the electrical quantity (P1, P2, P3, P4, P5) is the active power (P1, P2, P3, P4, P5) of the wind energy plant.

14. Wind energy plant according to claim 11, characterized in that the control means (22) is designed to adjust the new pitch angle (υ) by way of reducing a rotation speed set point ($n_{GS}$) supplied to the regulation means (12) by a defined offset.

15. Wind energy plant according to claim 14, characterized in that a characteristic diagram for determining the offset is retained in the control means (22).

16. Wind energy plant according to claim 14, characterized in that at least one function for calculating the offset is retained in the control means (22).

17. Wind energy plant according to claim 11, characterized in that the control means (22) is designed to adjust the new pitch angle (υ) by way of increasing a current rotation speed ($n_{GI}$) supplied to the regulation means (12) by a defined offset.

18. Wind energy plant according to claim 11, characterized in that the control means (22) is designed to adjust the new pitch angle (υ) by way of increasing a minimal pitch angle supplied to the regulation means (12) by a defined offset.

19. Wind energy plant according to claim 11, characterized in that the control means (22) is designed to reduce the offset over time to zero starting from an initial maximum value.

20. Wind energy plant according to claim 11, characterized in that the control means (22) has a comparison means for comparing the rotation speed of the rotor or generator ($n_{GI}$) to a threshold rotation speed and in that the control means (22) is designed to initiate the adjustment to the new pitch angle (υ) only if the rotation speed of the rotor or generator ($n_{GI}$) is above a threshold rotation speed and/or if the preset value prior to its reduction is above a threshold preset value.

* * * * *